United States Patent
Guo et al.

(10) Patent No.: US 12,426,106 B2
(45) Date of Patent: Sep. 23, 2025

(54) METHOD FOR CONNECTING AN ELECTRONIC DEVICE, E.G. A SMART SPEAKER, TO A TARGET WIRELESS ACCESS POINT

(71) Applicant: Orange, Issy-les-Moulineaux (FR)

(72) Inventors: Zhihong Guo, Beijing Dongcheng District (CN); Liang Han, Beijing Dongcheng District (CN)

(73) Assignee: Orange, Issy-les-Moulineaux (FR)

( * ) Notice: Subject to any disclaimer, the term of this patent is extended or adjusted under 35 U.S.C. 154(b) by 632 days.

(21) Appl. No.: 17/257,264

(22) PCT Filed: Jun. 21, 2019

(86) PCT No.: PCT/IB2019/000755
§ 371 (c)(1),
(2) Date: Dec. 30, 2020

(87) PCT Pub. No.: WO2020/008256
PCT Pub. Date: Jan. 9, 2020

(65) Prior Publication Data
US 2021/0368559 A1 Nov. 25, 2021

(30) Foreign Application Priority Data
Jul. 2, 2018 (WO) .............. PCT/CN2018/094101

(51) Int. Cl.
*H04W 48/16* (2009.01)
*G10L 15/22* (2006.01)
(Continued)

(52) U.S. Cl.
CPC ............ *H04W 76/11* (2018.02); *G10L 15/22* (2013.01); *H04W 48/16* (2013.01); *G10L 2015/223* (2013.01); *H04W 12/63* (2021.01)

(58) Field of Classification Search
CPC ... G10L 15/22; G10L 2015/223; H04W 48/16
(Continued)

(56) References Cited

U.S. PATENT DOCUMENTS

2002/0174177 A1* 11/2002 Miesen ............... H04L 65/1069
704/E15.045
2013/0223279 A1 8/2013 Tinnakornsrisuphap et al.
(Continued)

FOREIGN PATENT DOCUMENTS

CN 204810556 U 11/2015
CN 105652674 A 6/2016
(Continued)

OTHER PUBLICATIONS

International Search Report for International Application No. PCT/IB2019/000755 issued on Oct. 21, 2019.
(Continued)

*Primary Examiner* — George C Monikang
(74) *Attorney, Agent, or Firm* — Knobbe, Martens, Olson & Bear, LLP

(57) ABSTRACT

A method for triggering a wireless connection of an electronic device to a target wireless access point is disclosed. In one aspect, the method comprises detecting a voice command inputted at a microphone of the device; and sending, from the electronic device to the target wireless access point, a probe request indicating that the electronic device is compatible with a wireless connection setup protocol.

13 Claims, 2 Drawing Sheets

(51) Int. Cl.
*H04W 76/11* (2018.01)
*H04W 12/63* (2021.01)

(58) Field of Classification Search
USPC .................................. 381/110; 704/246, 251
See application file for complete search history.

(56) References Cited

U.S. PATENT DOCUMENTS

2013/0272164 A1   10/2013   Leonardos et al.
2017/0374552 A1   12/2017   Xia et al.

FOREIGN PATENT DOCUMENTS

| | | |
|---|---|---|
| CN | 105657805 A | 6/2016 |
| CN | 108199938 A | 6/2018 |
| EP | 3 225 054 A1 | 10/2017 |
| WO | WO 2016180101 A1 | 11/2016 |
| WO | WO 2018/075417 A1 | 4/2018 |

OTHER PUBLICATIONS

Notification of Transmittal of the International Search Report and the Written Opinion of the International Searching Authority for International Application No. PCT/CN2018/094101 mailed on Mar. 27, 2019.

* cited by examiner

METHOD FOR CONNECTING AN ELECTRONIC DEVICE, E.G. A SMART SPEAKER, TO A TARGET WIRELESS ACCESS POINT

CROSS-REFERENCE TO RELATED APPLICATIONS

This application is filed under 35 U.S.C. § 371 as the U.S. National Phase of Application No. PCT/IB2019/000755 entitled "METHOD FOR CONNECTING AN ELECTRONIC DEVICE TO A TARGET WIRELESS ACCESS POINT" and filed Jun. 21, 2019, and which claims priority to PCT/CN2018/094101 filed Jul. 2, 2018, each of which is incorporated by reference herein in its entirety.

BACKGROUND

Field

The present invention relates to the field of connected devices such as smart speakers. More particularly, the present invention relates to a method for wirelessly connecting an electronic device to a wireless access point.

Description of the Related Technology

Today, more and more electronic devices connect to internet via a wireless connection such as a Wifi connection. As an example of such "connected devices", a smart speaker is a type of wireless speaker which can be voice controlled. It offers numerous functions beyond playing audio, such as sending internet queries, controlling home automation devices, etc., and is generally provided with a virtual assistant. For example, Amazon's speakers are provided with an assistant named Alexa.

Smart speakers allow interactive actions and handsfree activation with the help of one "hot word", or "wake word" i.e. a predetermined keyword such as "Alexa" for Amazon's speakers.

To this end, smart speakers have to connect to the user's local network (and from this to Internet) for accessing query servers, in particular through Wi-Fi. However, this require to setup the Wi-Fi connection before using, and in particular to input connection credentials (Wi-Fi SSID and password), which is problematic as a smart speaker is generally not provided with any input interface, let alone a keyboard.

A first known solution is to use the "WPS" (Wi-Fi protected setup) technology developed by the Wi-Fi Alliance and described in the Specification document "Wi-Fi Protected Setup Specification", version 1.0h, published by the WiFi Alliance in December 2006. More precisely, the user presses a dedicated WPS button on the speaker and Wi-Fi gateway (nearly simultaneously), and thus the Wi-Fi gateway sends the credentials to setup the Wi-Fi connection for the speaker. The issue of this method is that it implies a physical button on the speaker, increasing the cost and not being a natural way of interaction with user.

A second known solution is to connect a mobile phone to the speaker by Bluetooth, then to use an application running on the mobile phone to configure the Wi-Fi connection of the speaker. This method is not easy to use, and the user needs a mobile phone to perform it.

There is consequently a need for a simple and user-friendly method for setting up the Wi-Fi connection of a smart speaker (or any other smart device) which does not require any button and does not involve any mobile phone.

SUMMARY OF CERTAIN INVENTIVE ASPECTS

For these purposes, the present invention provides a method for triggering a wireless connection of an electronic device to a target wireless access point, comprising the following steps:
  detecting a voice command inputted at a microphone of the device; and
  sending, from the electronic device to the target wireless access point, a probe request indicating that the electronic device is compatible with a wireless connection setup protocol.

As it will be shown, such use of a voice command allows an even simpler wireless connection without the need to use any physical interface such as a WPS button, in a very natural and easy way. In other words, an alternative way of triggering a wireless connection setup is provided, equivalent to pressing a physical button such as a WPS button on the electronic device, removing thus the need to use such a physical button when provided on the electronic device, or even the need to provide it on the electronic device, which may result in lowering the cost and complexity of the electronic device.

Preferred but non limiting features of this method are as follow:
  The method comprises, before the detecting step, a step of outputting at a speaker of the electronic device a voice message inviting a user to input of a voice command for triggering the connection of the electronic device to the target access point;
  sending step is only performed when said voice command is detected within a predetermined time period from the output at the speaker of the voice message inviting the user to input a voice command;
  outputting step is performed after having identified a nearby access point compatible with said wireless connection setup protocol as the target access point;
  identifying step comprises scanning for nearby access points compatible with said wireless connection setup protocol, the target access point being identified as the nearby access point compatible with said wireless connection setup protocol having the highest strength of signal among the nearby access points;
  the scanning step is triggered by the power-up of the electronic device;
  outputting step is performed when the target access point is already stored as a known access point of the electronic device but a connection attempt to the target access point has failed;
  the method further comprises detecting a user action performed in accordance with the wireless connection setup protocol at the target access point and, when said user action is performed within a predetermined time period following the sending of the probe request, completing the connection setup between the electronic device and the target access point using the wireless connection setup protocol;
  the method comprises, after the sending step, outputting at a speaker of the electronic device a voice message inviting a user to perform an action in accordance with the wireless connection setup protocol at the target access point in order to respond to the probe request the method further comprises if said voice command is
not inputted within a predetermined time period from
the output at the speaker of the voice message inviting
the user to input of a voice command for triggering the
connection, or if no user action is detected to be
performed in accordance with the wireless connection
setup protocol at the target access point, repeating the
method with another target access point;
said wireless connection setup protocol is the Wi-Fi
Protected Setup protocol, also known as WPS.

In a second aspect, the invention provides an electronic device comprising a microphone able to detect voice commands and a processing unit, characterized in that the processing unit is configured to trigger the sending, from the electronic device to a target wireless access point, of a probe request indicating that the electronic device is compatible with a wireless connection setup protocol when a predetermined voice command is detected by the microphone.

Preferred but non limiting features of this electronic device are as follow:
the electronic device comprises a speaker configured to
output a voice message inviting a user to input a voice
command for triggering the connection of the electronic device to the target access point;
the electronic device does not comprise any button for
setting up a connection using said wireless connection
setup protocol.

According to a third and a fourth aspects, the invention provides a computer program product, comprising code instructions for executing a method according to the first aspect for connecting an electronic device to a target wireless access point; and a computer-readable medium, on which is stored a computer program product comprising code instructions for executing a method according to the second aspect for connecting an electronic device to a target wireless access point.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF CERTAIN
ILLUSTRATIVE EMBODIMENTS

Architecture

Figure 1:
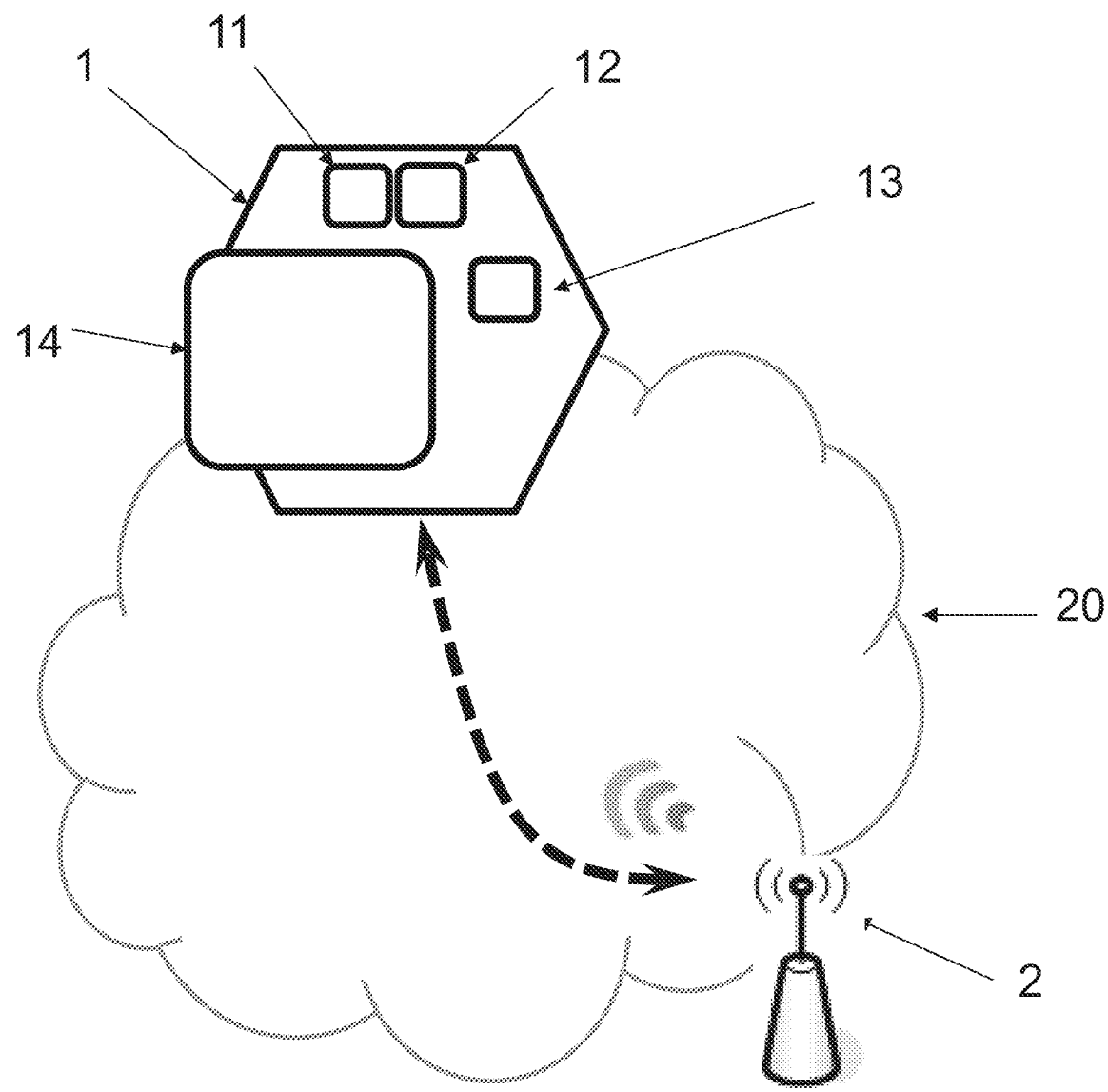
FIG. 1 illustrates an example of architecture of a network in which is performed the method according to the invention.

The present invention relates to a method for triggering a wireless connection of an electronic device 1 to a target wireless access point 2 generating a (local) wireless network 20 as represented by FIG. 1.

By "triggering a wireless connection" of the electronic device 1 to the target wireless access point 2, it is meant launching the setup of a configuration of the electronic device 1 for enabling such a wireless connection, i.e. selecting this access point 2 and memorizing a corresponding password (the network 20 is supposed to be a private wireless network with restricted access, wherein data are encrypted using a security mechanism). It is to be understood that the setup is only "launched", i.e. is simply attempted and could fail if the user does not perform all the required actions for ensuring that he has the right to connect to the target access point 2, as it will be discussed.

Successfully setting up the connection of the electronic device 1 to the target wireless access point 2 could be summarized as transmitting from the target wireless access point 2 to the device 1 "connection data" which are typically formed of the pair of a SSID ("Service Set Identifier", i.e. a network name of the target access point 2) and a password, with possibly some additional information like the security mechanism used.

The term "target" is used for designating the access point to which connection is intended among nearby access points, i.e. detectable access points to which a connection would be possible. Here, the wireless technology involved is typically Wi-Fi, so that the network 20 is typically protected using a mechanism such as WPA-AES ("Wi-Fi Protected Access" with "Advanced Encryption Standard") compatible with a specific wireless connection setup protocol to be used such as WPS (Wi-Fi Protected Setup).

Generally, the target access point 2 is an internet gateway or a router of the user (also called a "box"), while the other nearby access points are gateways or routers of neighbors, but it could be any kind of device able to generate and a wireless network 20, and the target access point 2 could be for instance a mobile terminal performing tethering.

The electronic device 1 to be connected comprises a processing unit 11, i.e. a CPU (one or more processors), a memory 12 (for example flash memory), a microphone 13 for inputting sound and a speaker 14 for outputting sound. Preferably, it does not comprise any other input interface, and in particular no keyboard, end even no button (even for powering up the electronic device) at all in some cases. It also comprises a communication unit for wireless connection to the target access unit 2 through the network 20, i.e. an antenna.

The memory 12 could be used possibly for storing applications, which can be of various types, and data. The electronic device 1 also typically comprises a battery (not illustrated), in particular a rechargeable battery (for instance lithium polymer), for powering the processing unit 11 and other units, but alternatively, the electronic device 1 may be plugged to a power supply.

The electronic device 1 is preferably a smart speaker as already explained, which has no interface besides the microphone 13 and the speaker 14, but it could be other devices such as a TV, a video game console, a household appliance such as a refrigerator, etc.

Method for Triggering a Connection

The processing unit 11 of the device 1 is configured to perform the present method for triggering a wireless connection of the electronic device 1 to the target wireless access point 2, such a connection being set up using a specific wireless connection setup protocol. By "setup wireless connection protocol", it is meant a protocol for exchanging connection data between an access point and a device for automatic connection of this device. In the following part of the description as well as in FIG. 2, the Wifi Protected Setup protocol, also called WPS, is explicitly cited as a specific example, but further developments of this standard and any other wireless connection setup protocol can be used.

The present invention takes advantage of the ability of an electronic device 1 having a microphone, such as a smart speaker for instance, to receive voice commands, in order to launch a wireless connection setup protocol exchange such as a WPS exchange, instead of having to provide a dedicated WPS button, specifically designed to trigger a connection in accordance with the WPS protocol, to be pressed by the user. When the electronic device 1 also has a speaker, such as a smart speaker for instance, the present invention further takes advantages of this speaker to play voice messages, in order to notify user there is WPS enabled access point nearby and also possibly guide the user during the connection setup process.

Figure 2:
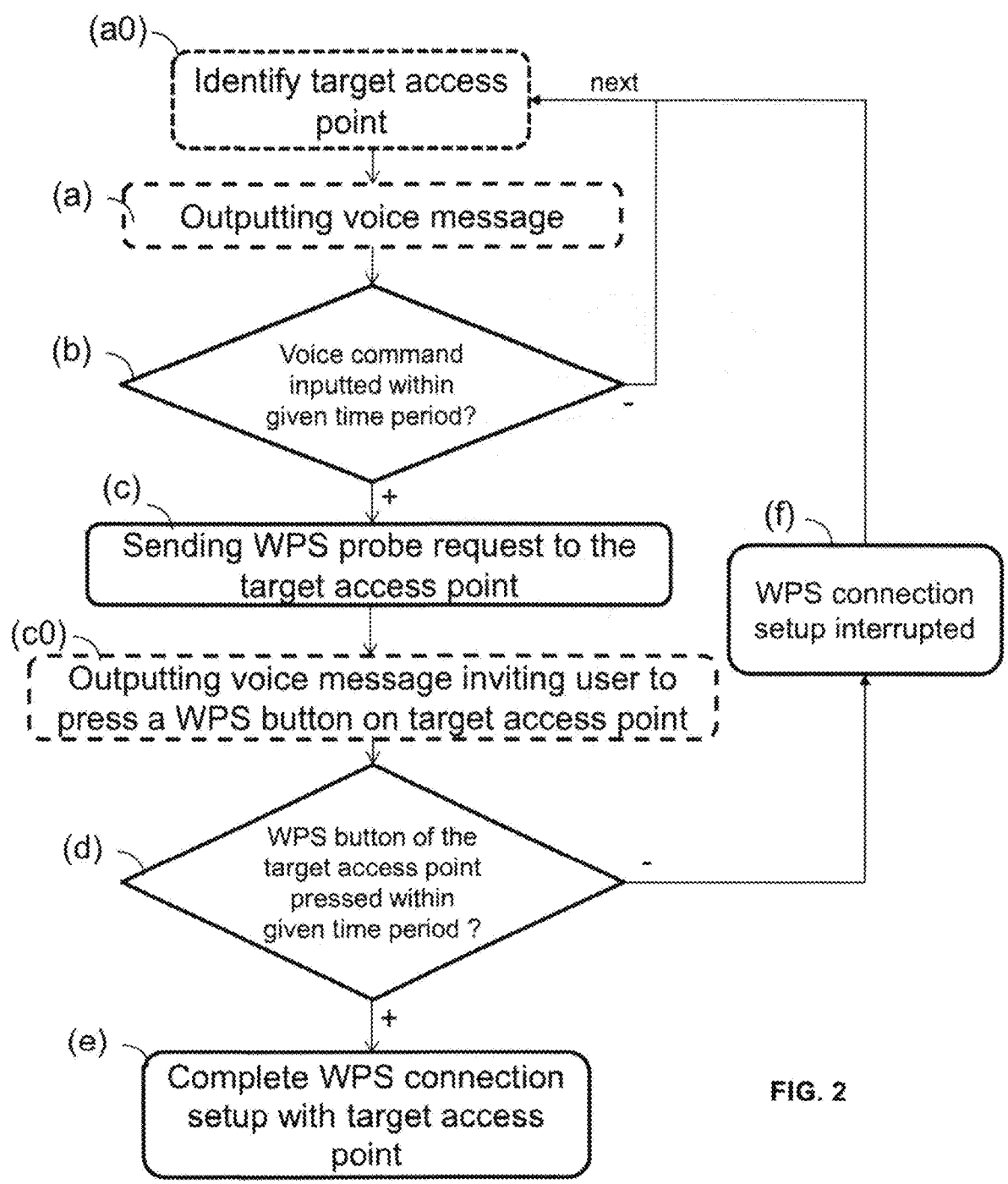
FIG. 2 illustrates an embodiment of the method according to the invention.

Thus, as it can be seen in FIG. 2, after an optional, though advantageous, step (a) which will be described later, a voice command (also called "connect command") inputted at the microphone 13 of the device 1 is detected in a detecting step (b).

In a first embodiment, such a voice command may be a predetermined voice command, specifically designed for triggering a connection using a predetermined wireless connection setup protocol such as WPS, for instance a phrase such as "OK connect". In that case, the processing unit 11 can be trained to recognize this specific voice command.

In another embodiment, this voice command can be a voice command designed for a different purpose than triggering a wireless connection, for instance a voice command corresponding to a default wake word (such as "Alexa" for Amazon's speakers) for performing a "wake up command", in order to wake up an electronic device being in sleep mode. Indeed, some electronic devices such as smart speakers are able to natively support a wake up command, i.e. without any network connection. In that case, the processing unit 11 is trained about how to detect the voice of the user and at least to recognize a wake word.

In a specific embodiment, it might be provided that, at a first connection of the electronic device with a first access point, only a default wake up command is set and thus can be used, then data can be subsequently downloaded for allowing the detection of a dedicated "connect command" for further connections to other access points, as described below.

After having detected a voice command instructing the electronic device to trigger a wireless connection with a target access point using the wireless connection setup protocol, an exchange of connection data with the target wireless access point 2 according to a wireless connection setup protocol such as WPS is attempted.

Such an "attempt" does not necessarily end up in transferring all the necessary connection data to the device (and then in establishing the connection). For instance, when using WPS protocol, a WPS button also has to be pressed on the target access point 2 in order to complete the exchange of connection data. It may be assumed that every access point compatible with WPS protocol presents such a WPS button. To this end, the electronic device 1 can output in step (c0) one or more voice messages to help the user to find and push the WPS button on the target access point 2.

In practice, in order to attempt this exchange of connection data following the detection of the voice command, a probe request is sent at step (c), from the electronic device 1 to the target wireless device 2, wherein this probe request indicates that the electronic device is compatible with a wireless connection setup protocol (WPS for instance).

This probe request is preferably similar to the probe request as defined in the wireless connection setup protocol, which is sent when the user pushes a button compatible with this wireless connection setup protocol. In other word, the access point 2 cannot distinguish a probe request as sent following input of the voice command, from a probe request sent following pushing a de dedicated button (e.g. WPS button).

The connection attempt succeeds after that the user performs an action in accordance with the wireless connection setup protocol at the target access point 2, i.e. typically after that the user presses a dedicated button compatible with the wireless connection setup protocol on the target access point 2, within a predetermined time period (generally 2 minutes) following the sending of the probe request by the electronic device 1.

If such a further action is detected (step (d)), on the access point side, it triggers a further exchange of connection data which eventually ends up in the establishment of a connection between the electronic device 1 and the target access point 2 (step (e)).

This further exchange of connection data may be similar to the exchange of connection data defined in the PushButton Configuration described in part 10.3 of the WPS protocol, after that a WPS button has been pressed on the access point and thus that a probe response has been received by the electronic device requesting connection, such a further exchange using in particular the EAP and/or UPnP protocols to exchange connection data in order to complete the Wifi connection. Again, the access point 2 "thinks" that a WPS button has been pushed at the device 1 and acts as so.

When inputting a voice command, the user could be far from the electronic device 1, and possibly close from the target access point 2, thus such a time period could be shortened, for instance to 30 seconds, in order to improve security.

If the WPS button of the target access point 2 is not pressed during this predetermined time period, the attempt fails (step (f)) and no connection data is transferred (see below).

Connection Message

As previously explained, the method preferably comprises, before the detecting step (b), an outputting step (a) wherein a voice message inviting a user to input a voice command for triggering the connection of the electronic device 1 to the target access point 2 is outputted at a speaker 14 of the device 1.

This voice message could advantageously identify the target access point 2, in particular by reciting an identifier of this target access point such as its SSID: "No internet connection, would you like to connect to the wireless network XXX using WPS protocol?". The output of this message could follow the input of another voice command of the user, which may be the default wake up command, or another specific command. Alternatively, the output of this message could be triggered by the identification of the target access point, i.e. the detection by the electronic device 1 of an access point nearby which is compatible with the wireless connection setup protocol supported by the electronic device 1.

A first advantage of this embodiment is that a very simple intuitive functioning can be achieved. Indeed, when the user wants to use its electronic device 1, (s)he naturally says the wake word in order to wake it from a sleeping mode.

If an internet connection is already established, then the electronic device 1 continues its normal functioning. Otherwise, the electronic device 1 detects that there is a problem, and then proposes to attempt connecting to the target access point, as explained below. In that case, the user just has to repeat the wake word for performing the rest of the present method and establishing in very simple way a connection using a wireless connection setup protocol such as WPS.

A second advantage of this embodiment is that security can be further improved by defining a time period for inputting the voice command (in particular less than 10 seconds, for instance 3 seconds). To this end, the sending step (c) is preferably only performed when the voice command inputted at a microphone 13 is detected within a time period from the output at the speaker 14 of the voice message inviting the user to input a voice command. Such a time period is typically predetermined and may be the same for all types of outputted voice message (for instance 10 seconds) or, on the contrary, may vary depending on the type of outputted voice message.

In other words, once it has outputted a voice message inviting the user to input of a voice command, the electronic device 1 "waits" for the user to input a voice command within a specific time period. If that is not the case, that is to say if such a voice command is inputted too late or not inputted at all, sending step (c) is not performed and the method is interrupted at that point.

A third advantage of this embodiment is that the user can verify which access point is considered by the electronic device 1 as the "target" access point 2. Indeed, the "target" access point could be a neighbor's access point. As the outputted message can recite the SSID of the target access point, the user can immediately recognize if the target access point 2 is the right one (e.g. an access point belonging to the user), and if that is not the case, the user can refrain from inputting the voice command in order to prevent connecting with an unknown access point.

A fourth advantage of this embodiment is that the user can be notified when there is a WPS enabled access point nearby, in order to invite the user to connect preferably with this specific access point using WPS.

In another embodiment, at the same time or just after that the probe request has been sent, another voice message may be outputted (c0) by the speaker 14 of the electronic device 1, this other voice message inviting the user to perform an action in accordance with the wireless connection setup protocol at the target access point 2 in order to respond to the probe request, and thus to proceed further with the connection setup. In particular, when the wireless connection setup protocol is WPS, such a voice message may invite the user to press a WPS button located on the target access point. This way, the user can be further notified to press the WPS button on the access point 2 at the correct time, which is easier for user to follow up.

Target Access Point

Outputting step (a), and thus the rest of the method, is preferably automatically performed in two cases:
1) when no access point stored as known for the electronic device 1 is reachable and the target access point 2 is identified as a nearby access point compatible with the same wireless connection setup protocol as for the electronic device 1.

This situation covers the cases where no access point is stored as an already known access point in the electronic device 1 (typically at the first use of the electronic device 1) or where none of the access points already stored as known in the electronic device 1 is detected nearby (for instance when the electronic device 1 has been moved);
2) when the target access point 2 is already stored as a known access point in the electronic device 1 but a connection attempt to this target access point has failed (for instance if the password has changed).

In the second case, there is no difficulty as the access point does not change. However, in the first case, it is necessary to choose a target access point 2 to attempt to connect with.

To this end, in the first case, there may be provided, before outputting a voice message inviting to input a voice command for triggering the connection, a further step of identifying (step a0) the target access point. This identifying step (a0) may advantageously comprise the scanning for nearby access points compatible with the wireless connection set up protocol and identifying, as the target access point 2, the nearby access point compatible with this wireless connection setup protocol having the highest strength of signal.

In a specific embodiment, this step of scanning may be triggered by the power-up of the electronic device 1. In other words, when the electronic device 1 is powered up, and in particular the first time the electronic device 1 is powered up and thus has yet any access point already stored in memory, such a scanning may be triggered to identify a first target access point to which the electronic device 1 can attempt to connect.

During such a scanning step, the electronic device 1 detects the identifiers of the nearby access points, such as SSID, that they broadcast and may advantageously determine, for each detected nearby access point, whether its identifier is associated with an indication that this access point is compatible with the wireless connection setup protocol the electronic device 1 is compatible with. Indeed, in a typical situation, access points broadcast their SSID in association with their compatibility with the WPS protocol.

The electronic device 1 can then retain only the nearby access points which indicate that they are compatible with the same wireless connection setup protocol the electronic device 1 is compatible with, when identifying a target access point.

It is to be understood that other criterions known to the skilled person could be used for choosing the target access point, as for instance the operator of the nearby access points, their security mechanism, etc. However, the criterion of the signal strength is efficient as in most cases the user's home access point will be closer than a neighbor's access point, and thus will provide a signal with a higher strength.

Nevertheless, there might be situations wherein a neighbor's access point could have a stronger signal than the user's home access point (for instance if it is placed on the floor just above the electronic device 1 while the user's home access point is placed in a farther room on the same floor). In such situations, the neighbor's access point may be automatically identified as the target access point 2.

In order to avoid such detrimental situations, it may be advantageously provided that, if the voice command is not inputted within the given time period from the output at the speaker 14 of the voice message inviting to input this voice command, the method is repeated with another target access point 2.

More precisely, in a specific embodiment:
the electronic device 1 detects the SSID of a first target access point providing the strongest signal (and which is compatible with the same wireless connection setup protocol) and outputs a voice message reciting the SSID of this first target access point, so that the user may detect if this first target access point is the right one (i.e. his/her home access point) or not the right one (i.e. not his/her home access point);
when the user detects that the target access point is not the right one, (s)he simply does not input the voice command, so that there is no detection by the electronic device 1 of a voice command inputted within the specific time period for doing so. Consequently, there is no probe request sent by the electronic device 1 and therefore no further exchange of connection data is attempted with this incorrect first target access point;

the method is then repeated again, but with another access point: a second access point with the second highest signal strength (the one with the highest signal strength among the other detected nearby access points) is identified as the new target access point 2, its SSID is detected by the electronic device 1 which outputs another voice message reciting this SSID.

assuming that this new target access point is the user's home access point, the user may recognize its SSID and inputs thereafter a voice command within the given time period;

as a consequence, a probe request is sent by the electronic device 1 to this new access point and an exchange of connection data may be attempted thereafter (e.g. if the user presses the wireless connection setup protocol button on his home access point in time, the exchange of connection data succeeds and the connection is setup).

Such a connection procedure is very effective, as the time period for inputting the connect command may be very short (typically a few seconds), so that the user can very rapidly pass through a plurality of wrong access points before reaching his/her own home access point.

In another embodiment, the present method could also be repeated with another target access point 2 if, following step (c), the connection attempt is not successful (in other words, even when detecting a voice command inputted within the given time period from the output at the speaker 14 of the voice message inviting to input this voice command).

Indeed, the user could input by mistake the connect command, since he has a very short time for reacting as explained. Thus the detection of step (b) could be achieved even when the target access point 2 is not the right one. However, in that case, the user just has to avoid pressing the wireless connection setup protocol button of the wrong access point (actually, in most cases, (s)he will not even be able to press it, since the wrong access point is the neighbor's one), so that the connection attempt fails, and the method may then be repeated with another one of the detected nearby access points.

The present invention is not limited to the repeating of the method in the above-mentioned situations. In other embodiments, it might be provided for instance that, if the detecting step (b) or the connection attempt following step (c) fails, another known connection method can be then used, such as through the use of a mobile terminal (in particular through a dedicated application). In particular, this mobile terminal can be directly connected to the electronic device 1 through a short range wireless communication (for instance Bluetooth) and perform itself a WPS exchange with the target access point 2 for retrieving connection data and sending it to the electronic device 1.

Device, Computer Product Program, and Computer-Readable Medium

The present invention also concerns the electronic device 1 for performing the method as previously defined. As explained, the device 1 is typically a smart speaker adapted for connecting to a wireless network 20 through an access point 2, and comprises at least a processing unit 11, a microphone 13 and a speaker 14. It typically also comprises a memory 12 and a battery.

This electronic device 1 is compatible with a wireless connection setup protocol, such as WPS for instance, which can be used to connect the electronic device 1 to an access point 2 when this access point 2 is also compatible with the same wireless connection setup protocol.

In a preferred embodiment, the electronic device 1 does not comprise any button for setting up a connection using this wireless connection setup protocol. For instance, when electronic device 1 is compatible with the WPS protocol which foresees the possibility to use a WPS hardware button in order to easily setup a Wifi connection, the electronic device 1 does not comprise such a WPS button. In that case, the electronic device 1 may comprise a single physical button, i.e. the ON/OFF button for powering on and off the electronic device 1, or even no physical button at all in a cost-optimized embodiment.

The processing unit 11 is configured to implement:

advantageously outputting (a) at the speaker 14 a voice message inviting a user to input a voice command for connecting the electronic device 1 to a target access point 2;

triggering the sending, from the electronic device 1 to the target wireless access point 2, of a probe request indicating that the electronic device 1 is compatible with the wireless connection setup protocol when a voice command is detected by the microphone 13 of the electronic device 1.

The invention further proposes a computer program product, comprising code instructions for executing (in particular with a processing unit 11 of the electronic device 1) the previously described method, as well as a computer-readable medium (in particular a memory 12 of the device 1), on which is stored a computer program product comprising code instructions for executing said method.

The invention claimed is:

1. A method of triggering a wireless connection of an electronic device to a target wireless access point, the method comprising:

detecting a SSID of a target wireless access point which is compatible with a wireless connection setup protocol;

outputting at a speaker of the electronic device a voice message inviting a user to input of a voice command for triggering the connection of the electronic device to the target access point, the voice message reciting the detected SSID of the target wireless access point; and responsive to the detection of a voice command inputted at a microphone of the device after that the voice message has been outputted by the speaker, sending, from the electronic device to the target wireless access point, a probe request indicating that the electronic device is compatible with the wireless connection setup protocol.

2. The method of claim 1, wherein sending is only performed when the voice command is detected within a predetermined time period from the output at the speaker of the voice message inviting the user to input a voice command.

3. The method of claim 1, wherein outputting is performed after having identified a nearby access point compatible with the wireless connection setup protocol as the target access point.

4. The method of claim 3, wherein identifying comprises scanning for nearby access points compatible with the wireless connection setup protocol, the target access point being identified as the nearby access point compatible with the wireless connection setup protocol having the highest strength of signal among the nearby access points.

5. The method of claim 4, wherein the scanning is triggered by a power-up of the electronic device.

6. The method of claim 1, wherein outputting is performed when the target access point is already stored as a known access point of the electronic device but a connection attempt to the target access point has failed.

7. The method of claim 1, further comprising detecting a user action performed in accordance with the wireless connection setup protocol at the target access point and, when the user action is performed within a predetermined time period following the sending of the probe request, completing a connection setup between the electronic device and the target access point using the wireless connection setup protocol.

8. The method of claim 7, comprising, after the sending, outputting at a speaker of the electronic device a voice message inviting a user to perform an action in accordance with the wireless connection setup protocol at the target access point in order to respond to the probe request.

9. The method of claim 8, further comprising, if the voice command is not inputted within a predetermined time period from the output at the speaker of the voice message inviting the user to input of a voice command for triggering the connection, or if no user action is detected as being performed in accordance with the wireless connection setup protocol at the target access point, repeating the method with another target access point.

10. The method of claim 1, wherein the wireless connection setup protocol is the Wi-Fi Protected Setup (WPS) protocol.

11. An electronic device comprising a microphone able to detect voice commands, a processing unit, configured to detect a SSID of a target wireless access point which is compatible with a wireless connection setup protocol, a speaker to output a voice message inviting a user inviting a user to input a voice command for triggering the connection of the electronic device to the target wireless access point, the voice message reciting the detected SSIID of the target wireless access point, wherein the processing unit is further configured to trigger the sending, from the electronic device to a target wireless access point, of a probe request indicating that the electronic device is compatible with a wireless connection setup protocol in response to the detection of a voice command inputted at the microphone after that the voice message has been outputted by the speaker.

12. The electronic device of claim 11, wherein the electronic device does not comprise any button for setting up a connection using the wireless connection setup protocol.

13. A computing environment comprising a processor and a non-transitory memory, the non-transitory memory storing code instructions executed by the processor to implement the method of claim 1 for connecting an electronic device to a target wireless access point.

* * * * *